Patented Jan. 26, 1943

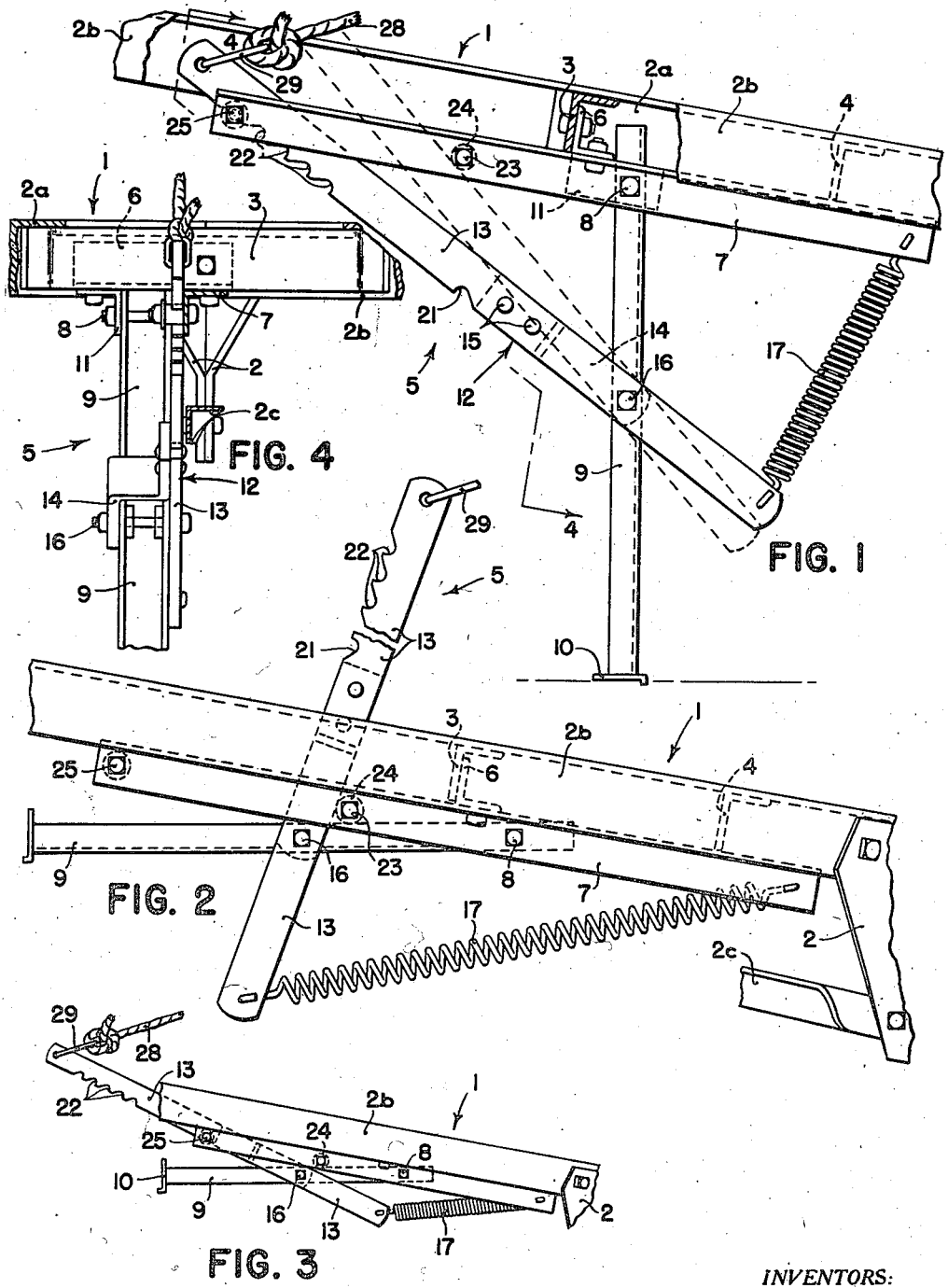

2,309,618

UNITED STATES PATENT OFFICE 2,309,618

RETRACTABLE SUPPORT

William A. Hyland and Royce R. Borngraeber, Horicon, Wis., assignors to Deere & Company, Moline, Ill., a corporation of Illinois Application July 13, 1940, Serial No. 345,346

15 Claims. (Cl. 280—33.4)

The present invention relates generally to retractable supports or stands which are particularly adapted to hold the front end of a two wheel vehicle of the trailer type up in a position to facilitate connecting the vehicle to or disconnecting it from a tractor drawbar.

The object and general nature of the present invention is the provision of a support or stand device which is so constructed and arranged that the supporting leg can be either raised or lowered with the pull of one rope or cable, the pull being in the same direction for both positions of the supporting leg. A further feature of this invention is the provision of means whereby the leg is securely latched in its transport or upper position so as to prevent inadvertent unlatching of the leg when the outfit travels over rough ground or the like and is subjected to vibration, jars and the like as a result thereof. Still further, another feature of this invention is the provision of means whereby a pull on the controlling cable positively elevates the leg into a transport position and a subsequent release of the cable permits suitably arranged spring means to latch the leg in its raised position.

These and other objects and advantages of the present invention will be apparent to those skilled in the art after a consideration of the following detailed description, taken in conjunction with the accompanying drawing.

In the drawing:

Figure 1 is a side view of a supporting stand in which the principles of the present invention have been embodied, the parts being shown in their supporting position with the supporting leg in engagement with the ground;

Figure 2 is a view similar to Figure 1 showing the manner in which a pull on the controlling cable positively raises the supporting leg into its retracted or transport position;

Figure 3 is a view similar to Figures 1 and 2 showing the position of the parts after the cable has been released and the leg latched in its upper or transport position; and Figure 4 is a section taken generally along the line 4—4 of Figure 1.

Referring now to the drawing, more particularly to Figure 1, the reference numeral 1 indicates a part of a vehicle which it is desired to support, such as the forwardly projecting tongue or hitch frame of a grain drill, having front hitch plates 2 fastened to rearwardly diverging laterally spaced apart angle members 2a and 2b connected by a cross bar 3 and reenforced by a rearwardly extending draft bar or angle 2c. The supporting stand, with which the present invention is particularly concerned, is indicated in its entirety by the reference numeral 5 and includes a generally longitudinally extending attaching angle 7 secured, as by welding or the like, to a pair of short transverse attaching angles 4 and 6 which are bolted or otherwise connected to the hitch bars 2a and 2b and to the cross bar 3. Any other suitable means may be employed for connecting the stand 5 to the hitch frame 2 or some other part of the vehicle. The attaching angle 6 carries an angle bracket 11 spaced from the angle 7, and both are apertured to receive a pivot 8 upon which a leg 9 is mounted for swinging movement from a generally vertical position rearwardly to a retracted or folded position for transport. At its lower end the leg 9 is provided with a ground engaging foot 10.

A link member 12 comprising a bar 13 and a hammer strap 14 secured, as by rivets 15, to the bar 13 is pivoted, as at 16, to the leg 9, which is disposed between the bar 13 and the strap. The forward end of the member 12 is connected by a spring 17 to the forward end of the attaching member 7. The bar 13 is provided with a forward notch or tooth 21 and a plurality of rear notches or teeth 22. A roller 24 is carried by the member 7 on a pin or stud 23, rearwardly of the pivot 8, and at the rear end of the member 7 the latter carries a ratchet pin 25 which is adapted to be engaged by any one of the teeth 21, 22. A control cable 28 is secured by a link 29 to the rear end of the arm or link 12 and extends forwardly to a point convenient to the operator, usually to the seat of the tractor which propels the implement 1.

The operation is substantially as follows:

Figure 1 illustrates the position of the parts when the leg 9 is in a vertical position supporting the tongue 2. When it is desired to raise the supporting stand into its transport position, the front end of the tongue 1 is first connected with the tractor so as to be supported thereby and then, if necessary, the tractor is backed slightly in order to relieve the pressure of the tooth 21 on the ratchet pin 25. Next the operator pulls forward on the cable 28 which first swings the arm or link 12 about the pivot 16 until the forward edge of the arm 12 engages the roller 24 (dotted lines, Figure 1). The latter then serves as a fulcrum so that continued pull on the cable 28 swings the leg 9 in a clockwise direction about the pivot 8 into the position shown in Figure 2. This movement of the arm 12, which is clockwise about the roller 24, tensions the spring 17. The rearward and upward swinging movement of the supporting leg 9 may be aided by driving the outfit forwardly. When the leg 9 has been raised to the position shown in Figure 2, in which position the spring 17 is under maximum tension, the operator releases his hold on the cable 28, whereupon the spring 17 swings the arm 12 in a counterclockwise direction so as to bring the notch or tooth 21 into engagement with the ratchet pin 25, whereby the leg 9 is then held in its raised or transport position, as shown in Figure 3. As will be clear from this figure, the effect of the tension in the spring 17 and the weight of the leg 9, is to hold the arm or link 12 latched firmly against the ratchet pin 25.

When it is desired to lower the leg 9, the operator pulls on the cable 28 enough to release the notch or tooth 21 from the pin 25 whereupon the leg 9 swings down under the action of gravity, aided by the pull on the cable 18 against the leg 13 which moves the parts 9, 13 into a position where the spring 17 tends to pull the leg 9 down. In the position shown in Figure 3, the spring 17 tends to hold the leg up, but after the leg 9 has swung downwardly beyond a certain point, the spring 17 aids in swinging the leg downwardly into a supporting position. When the leg 9 engages the ground and is in a position to support the tongue 1, the operator releases his hold on the cable and then the spring 17 swings the link or arm 12 in a counterclockwise direction, engaging one of the teeth 22 with the ratchet pin 25. This locks the leg 9 against rearward swinging movement and therefore prevents the stand from collapsing. The leg 9 is prevented from swinging forwardly by virtue of the fact that the upper end of the leg 9 engages the forward flange of the forward angle 6, as best shown in Figure 1.

As described above, the operation of the stand is positive yet the raising and lowering of the stand may be effected very conveniently. A pull on the rope will raise the stand if it is in a lowered position, and a pull on the rope will permit the stand to lower if it is in its raised or transport position.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A supporting stand for a vehicle or the like, comprising a leg pivoted to the vehicle and swingable from a supporting position to a transport position, a link pivoted to said leg and provided with a set of spaced apart teeth, a part on the vehicle with which said teeth are adapted to engage, there being one tooth for holding said leg in transport position and at least one other tooth for holding said leg in supporting position, cable means connected with said link for disengaging the same from said vehicle part, and a part on the vehicle against which said cable means is adapted to move said link, the latter reacting against said vehicle part so that a pull on said cable means acts through said link for raising said leg.

2. A support for a vehicle tongue or the like, comprising a leg pivoted to said tongue for movement into either a supporting position or a transport position, an arm pivoted to said leg adjacent one end thereof and provided with a plurality of teeth adjacent the other end, a part on the vehicle tongue adapted to be engaged by one or the other of the teeth on said arm for holding the leg in either of its positions, a spring connected between said one end of said arm and said tongue for yieldingly urging said arm into engagement with said vehicle part, tension means connected with the other end of said arm for disengaging the same from said vehicle part to provide for movement of the leg from one position to the other, said tension means disengaging said arm from said vehicle part in either position of said leg, and a second part on the vehicle tongue for causing a pull on said tension means to swing said leg into its transport position against the tension of said spring means, the latter after the pull on said tension means has been released serving to swing said arm about said second part and into engagement with said first part.

3. A support for a vehicle tongue or the like, comprising a leg pivoted to said tongue for movement into either a supporting position or a transport position, a link pivoted intermediate its ends to said leg, spring means connected between said tongue forward of said leg and the forward end of said link, the rear end of said link being provided with a plurality of teeth, a ratchet pin on said tongue adapted to be engaged by said link, said teeth being spaced so that said leg may be held in either of its positions by said link, a cable connected with the rear portion of said link and adapted when pulled to disengage the link from said ratchet pin, said leg moving downwardly into its supporting position if the cable is pulled when said link is in a position holding said leg in a transport position, and a roller mounted on said tongue in a position to be engaged by said link when said cable is pulled with the leg in its lowered position, whereby said roller acts as a fulcrum so that a continued pull on said cable acts through said link to raise the leg into a transport position and to tension said spring means, the subsequent release of said cable permitting said spring means to swing said link over into a position latching said leg in its transport position.

4. A supporting stand for a vehicle or the like, comprising a leg pivoted to the vehicle and swingable from a supporting position to a transport position, a link pivoted to said leg and engageable with said vehicle for holding said leg in supporting position, a tension member connected with said link and adapted to disengage the same from said vehicle, spring means for normally urging said link toward engagement with said vehicle, and means on the vehicle serving as a fulcrum against which said link bears when tension is applied to said link through said tension means for positively moving said leg into its transport position against the tension of said spring means.

5. A support as defined in claim 4, further characterized by said spring means being arranged so that, after the pull on said tension means has been released, it serves to swing said link about said fulcrum means into engagement with said vehicle to hold said leg in its transport position.

6. A supporting stand for a vehicle or the like, comprising a leg pivoted to the vehicle and swingable from a supporting position to a transport position, a link pivoted to said leg and extending on both sides of said leg, link actuating means connected to one end of said link, and a spring connected between the other end of said link and the vehicle and adapted in one position to swing the leg downwardly toward its supporting position.

7. A supporting stand for a vehicle or the like, comprising a leg pivoted to the vehicle and swingable from a supporting position to a transport position, and spring means acting between the leg and the vehicle for holding the leg in its transport position when it is in that position and for holding said leg in its supporting position when it is in the latter position.

8. A supporting stand for a vehicle or the like, comprising a leg pivoted to the vehicle and swingable from a supporting position to a transport position, a link pivoted to said leg and having one end engageable with the vehicle for holding the leg in one position, springs means connected between the other end of said link and the vehicle for urging said one end of the link into engagement with said vehicle, and means connected with said link for disengaging it from the vehicle.

9. A supporting stand for a vehicle or the like, comprising a leg pivoted to the vehicle and swingable from a supporting position to a transport position, fulcrum means on the vehicle, and a member connected with said leg and reacting against said fulcrum means for swinging said leg toward one of its positions.

10. A supporting stand for a vehicle or the like, comprising a leg pivoted to the vehicle and swingable from a supporting position to a transport position, fulcrum means on the vehicle, and a member pivotally connected with said leg and slidably engageable with said fulcrum means so as to react thereagainst and swing said leg toward one of its positions, said member sliding relative to said fulcrum means when the leg swings toward said one position.

11. A supporting stand for a vehicle or the like, comprising a leg pivoted to the vehicle and swingable from a supporting position to a transport position, fulcrum means on the vehicle, a member pivotally connected with said leg and engageable with said fulcrum means so as to react thereagainst and swing said leg toward one of its positions, and interengaging means on the vehicle and pivoted member for holding said leg in one of its positions.

12. A supporting stand for a vehicle or the like, comprising a leg pivoted to the vehicle and swingable from a supporting position to a transport position, fulcrum means on the vehicle, a member pivotally connected with said leg and engageable with said fulcrum means so as to react thereagainst and swing said leg toward one of its positions, and interengaging means on the vehicle and pivoted member for holding said leg in said one position.

13. A supporting stand for a vehicle or the like, comprising a leg pivoted to the vehicle and swingable from a supporting position to a transport position, fulcrum means on the vehicle, a member pivotally connected with said leg and engageable with said fulcrum means so as to react thereagainst and swing said leg toward one of its positions, and interengaging means on the vehicle and pivoted member for holding said leg in the other of its positions.

14. A supporting stand for a vehicle or the like, comprising a leg pivoted to the vehicle and swingable from a supporting position to a transport position, a link pivoted to said leg and extending on opposite sides of the latter, spring means acting against said link adjacent one end thereof, and means adjacent the other end of said link for controlling the position of the effective line of action of the spring means on said leg relative to the pivot connections between the latter and the vehicle and the link, respectively, whereby to provide for moving the leg toward one or the other of its positions.

15. A supporting stand for a vehicle or the like, comprising a leg pivoted to the vehicle and swingable from a supporting position to a transport position, a link pivoted to said leg and engageable with the vehicle to hold the leg in its transport position, spring means connected with the link and vehicle at points such that when the leg is in its transport position said spring means exerts a force tending to hold the leg in its transport position, and means connected with said link for disengaging it from the vehicle and shifting said link into a position where said points are so disposed that said spring means acts to move said leg into a supporting position.

WILLIAM A. HYLAND.
ROYCE R. BORNGRAEBER.